United States Patent
Fontoura et al.

(10) Patent No.: US 8,103,748 B2
(45) Date of Patent: Jan. 24, 2012

(54) RULE-BASED METHOD AND SYSTEM FOR MANAGING HETEROGENOUS COMPUTER CLUSTERS

(75) Inventors: Marcus Felipe Fontoura, San Jose, CA (US); Eustus Dwayne Nelson, Washington, DC (US); Thomas Khanh Truong, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 2625 days.

(21) Appl. No.: 10/152,251

(22) Filed: May 20, 2002

(65) Prior Publication Data
US 2003/0217134 A1 Nov. 20, 2003

(51) Int. Cl.
*G06F 15/177* (2006.01)
(52) U.S. Cl. ......... 709/221; 707/737; 711/111; 711/154
(58) Field of Classification Search .................. 709/217, 709/223, 224, 200, 221
See application file for complete search history.

(56) References Cited

U.S. PATENT DOCUMENTS

| | | | |
|---|---|---|---|
| 5,524,253 A | 6/1996 | Pham et al. | 395/800 |
| 5,666,486 A | 9/1997 | Alfieri et al. | 395/200.47 |
| 6,038,651 A | 3/2000 | VanHuben et al. | 712/21 |
| 6,038,677 A | 3/2000 | Lawlor et al. | 714/4 |
| 6,128,657 A * | 10/2000 | Okanoya et al. | 709/224 |
| 6,332,180 B1 | 12/2001 | Kauffman et al. | 711/153 |
| 6,338,112 B1 | 1/2002 | Wipfel et al. | 710/269 |
| 6,393,485 B1 * | 5/2002 | Chao et al. | 709/231 |
| 6,466,980 B1 * | 10/2002 | Lumelsky et al. | 709/226 |
| 6,922,724 B1 * | 7/2005 | Freeman et al. | 709/223 |
| 6,970,913 B1 * | 11/2005 | Albert et al. | 709/217 |
| 2002/0099970 A1 * | 7/2002 | Zhao et al. | 714/4 |
| 2003/0120771 A1 * | 6/2003 | Laye et al. | 709/224 |
| 2005/0066014 A1 * | 3/2005 | Willehadson et al. | 709/220 |

FOREIGN PATENT DOCUMENTS
JP  09055733 A  2/1997

* cited by examiner

*Primary Examiner* — Dustin Nguyen
(74) *Attorney, Agent, or Firm* — John L. Rogitz

(57) ABSTRACT

A system and method for managing heterogenous clusters asynchronously accesses operating information received from the clusters by invoking services on the clusters to send the necessary information, which is then evaluated against rules supplied by the clusters. The services can be dynamically changed or added to support heterogenous cluster management. When a rule is triggered the appropriate cluster is informed by a management service, so that the cluster can undertake load balancing/storage balancing activities as appropriate among its nodes.

35 Claims, 4 Drawing Sheets

ARCHITECTURE

ARCHITECTURE

OVERALL FLOW

MAPPING TO DB PROFILE

DB SCHEMA

RULE-BASED METHOD AND SYSTEM FOR MANAGING HETEROGENOUS COMPUTER CLUSTERS

BACKGROUND OF THE INVENTION

1. Field of the Invention

The present invention relates to managing computer clusters.

2. Description of the Related Art

Computer clusters are groups of processors that work in concert to undertake various tasks by hosting software applications that execute the tasks. For instance, a first cluster of computers might support one or more Web crawlers to undertake crawler functions, such as crawling the Internet, whereas a second cluster might support one or more indexers that index the information obtained from the crawlers. Still a third cluster might host one or more data miners that exploit the indices produced by the indexers to mine data from the crawled pages, and so on.

As recognized herein, plural clusters might exist in a single enterprise. For example, in the above hypothetical a Web site search engine might employ all three clusters. The present invention further recognizes that, as in the above example, the clusters might be heterogenous, i.e., each cluster hosts its own type of application and thus has its own unique characteristics.

In clustered computing, it is often necessary to manage processor workload and data storage among the computers in the cluster, to avoid load imbalance and to optimize performance. That is, it is often the case that a cluster controller must cause one processor to assume work from another, more heavily loaded processor, or for a data storage component of a cluster to reallocate storage tasks among several disks to maintain balanced capacity. The present invention recognizes that the rules for cluster management typically vary depending on the cluster type. Thus, a one-size-fits-all approach to applying rules for cluster management is not feasible for heterogenous clusters, particularly clusters that can evolve over time. Accordingly, the present invention recognizes a need for a method and system for implementing cluster management rules for plural, heterogenous clusters that is flexible and effective.

SUMMARY OF THE INVENTION

The invention is a general purpose computer programmed according to the inventive steps herein to manage computer clusters, including different types of clusters (heterogenous clusters), using a flexible, service-based architecture. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below.

Accordingly, a computer-implemented method is disclosed for managing heterogenous computer-related clusters. The method includes establishing profiles related to the clusters. The profiles represent rules and associated data gathering services that are hosted at the associated cluster. The data gathering service is invoked to send operating information, and the method then includes asynchronously accessing the operating information to evaluate the rules. If at least one condition related to a rule is evaluated as being satisfied, a management service informs the associated cluster thereof. Consequently, the cluster can execute appropriate action, with the use of a service-based architecture facilitating management of heterogenous clusters.

Preferably, each profile is received from its respective cluster in an XML message. The profiles can be stored in a relational database. To build the database, profile information can be stripped from profile messages received from the clusters and added to the database. In a preferred non-limiting implementation, the database includes at least one rule identification correlated with at least one service identification. If desired, two rules may be correlated with a complex rule, with each rule correlated with the complex rule having an associated service. Both the data gathering services and the management service may be dynamically changed. In any case, the correlation of a service to a rule preferably is defined by the associated cluster.

In another aspect, a computer system includes plural heterogenous clusters and a management engine that accesses a profile database populated with information received from the clusters pertaining to rules, including complex rules, and to related information services. The management engine invokes the information services to send operating information from their respective clusters. Also, the management engine periodically accesses the operating information and evaluates the rules using the operating information. If a rule is evaluated as being satisfied based on information in the database, the management engine informs the appropriate cluster, thereby indicating the necessity of load balancing and/or storage balancing activities by the cluster.

In yet another aspect, a computer program device contains computer readable means that include means for accessing operating information received from information services associated with respective clusters, with the clusters not being constrained to be homogenous. Means evaluate rules using the operating information, with means informing a cluster if a rule has been evaluated as indicating the need for management activity.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
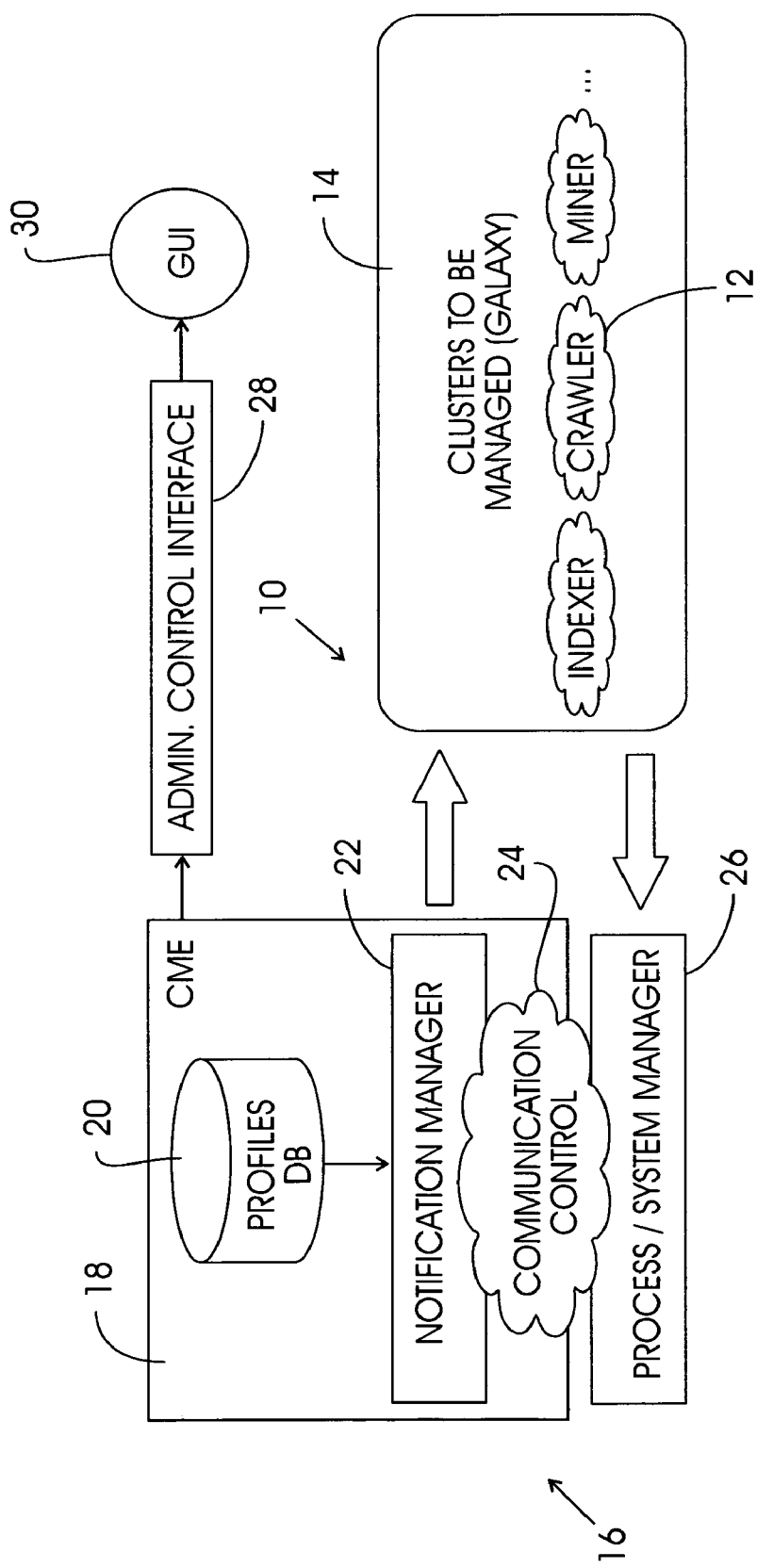
FIG. 1 is a block diagram of the present system architecture.

Referring initially to FIG. 1, a system is shown, generally designated 10, for managing heterogenous computer clusters 12 in a galaxy 14 of clusters. As shown, the clusters 12 can be defined or established by the genre of applications that run on them, i.e., a first set of individual computers and/or related storage devices can be grouped in a first cluster because a first type of application runs on them, while a second set of individual computers and/or related storage devices can be grouped in a second cluster because a second type of application runs on them. In non-limiting examples, a first cluster can host one or more Web indexer applications, a second cluster can host one or more Web crawler applications, and a third cluster can host one or more data miner applications.

The preferred system 10 includes a cluster management component 16 that functions in accordance with the logic below. In the preferred, non-limiting architecture shown in FIG. 1, the cluster management component 16 can include a cluster management engine 18 which in turn can include a cluster profile database 20, preferably an XML-enabled database, such as a DB2 XML extender relational database, and one or more logic-executing notification managers 22. The notification manager or managers 22 can be services that communicate, using communication controls 24, with a process/system manager 26. As intimated above, plural notification manager services can be implemented if needed, in which case a notification manager dispatcher could be provided by the engine 18 to look up, e.g., a universal description, discovery, and integration (UDDI) registry to determine which notification manager would handle which rule.

As can be appreciated in reference to FIG. 1, the process/system manager 26 receives information from the clusters 12, while the notification manager 22 sends information to the clusters 12, in accordance with the logic disclosed below via a network such as the Internet. If desired, the cluster management engine 18 can communicate with an administration control interface 28 to drive a graphical user interface 30 to enable a person to monitor and/or control the operation of the system 10.

In exemplary non-limiting implementations, the communication controls 24 can be a service that facilitates asynchronous communication while providing guarantees of message delivery, fault tolerance, and logging of communications. As non-limiting examples, the communication controls 24 can be implemented by the systems referred to in the art as "Vinci" and "TSpaces". Moreover, the administration control interface 28 with graphical user interface 30 can be an application that allows user interaction with the system 10 and that can be effected by, e.g., Java Server Pages. The administration control interface 28 preferably supports login, logout, event log/bug reporting, and administration services. It can include an input device such as a keyboard or mouse as well as an output device such as a monitor. Other input devices, including keypads, trackballs, and voice recognition devices can be used, as can other output devices, such as printers, other computers or data storage devices, and computer networks.

It is to be understood that the cluster management component 16 is implemented by computer such as a personal computer made by International Business Machines Corporation (IBM) of Armonk, N.Y. Other digital processors, however, may be used, such as a laptop computer, mainframe computer, palmtop computer, personal assistant, or any other suitable processing apparatus.

In any case, the processor of the cluster management component 16 undertakes certain of the logic of the present invention, which may be executed by a processor as a series of computer-executable instructions. The instructions may be contained on a data storage device with a computer readable medium, such as a computer diskette having a computer usable medium with code elements stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of C/C++ code.

Indeed, the flow charts herein illustrate the structure of the logic of the present invention as embodied in computer program software. Those skilled in the art will appreciate that the flow charts illustrate the structures of computer program code elements that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 2:
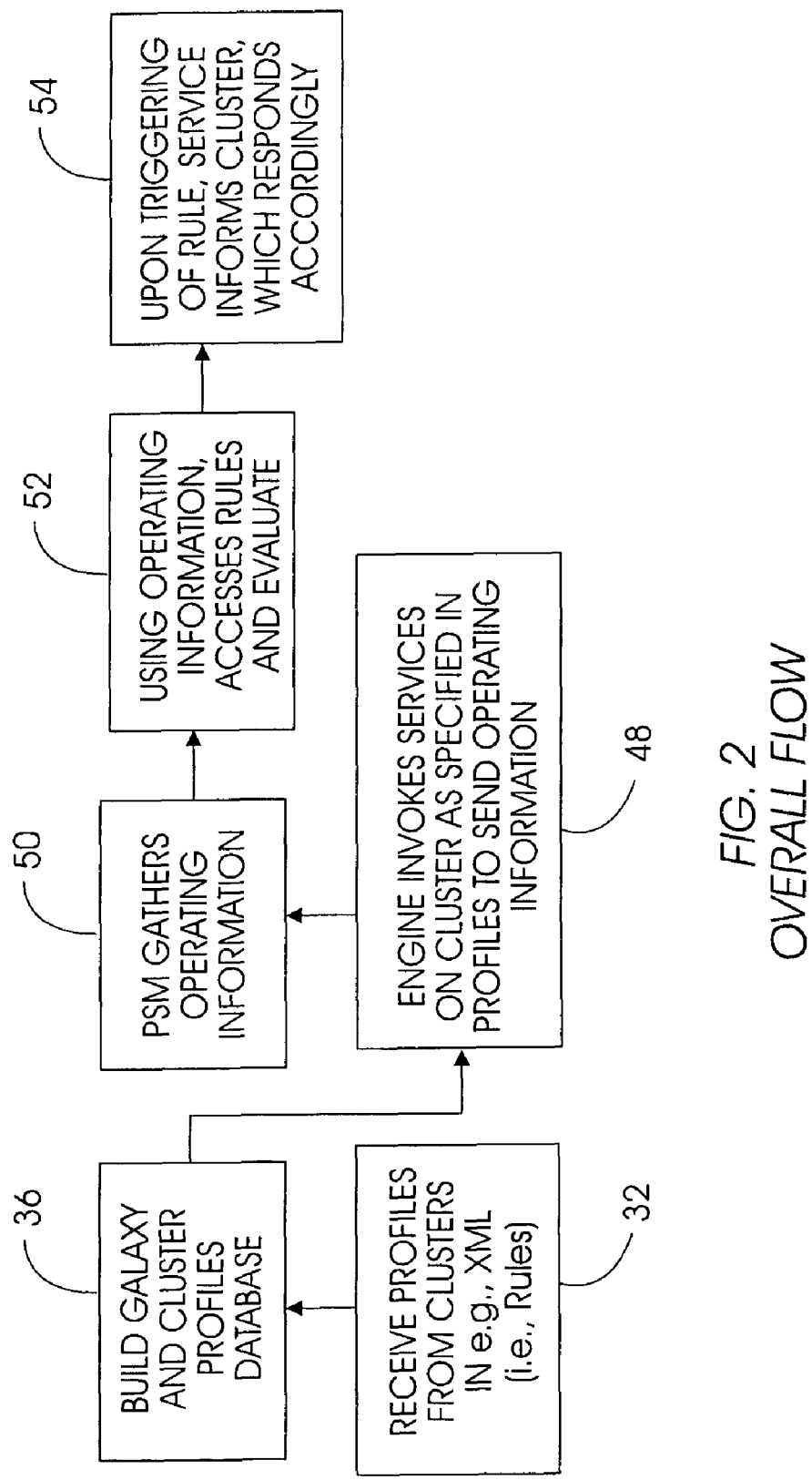
FIG. 2 is a flow chart of the preferred logic.

Now referring to FIG. 2, commencing at block 32 profiles relating to how the various clusters 12 are to be managed are received by receiving profile information pertaining to each cluster 12 from the clusters 12, as well as receiving profile information relating to the galaxy 14 as a whole. This information preferably but not necessarily is received in XML-formatted messages, such as the message 34 shown in FIG. 3. As shown, the information can include the identification of a complex rule that embodies plural sub-rules (referred to as rules "1" and "2" in the message 34) that, as indicated by the Boolean "and" operator in the second line in the case of the exemplary message 34 shown, must both be satisfied to satisfy the complex rule. The first rule shown in the illustrative example of FIG. 3 designates a data gathering service name (in this case, "CPU") and a service value (in the example shown, "90"). In contrast, the second rule shown in the illustrative example of FIG. 3 designates a data gathering service name (in this case, "space") and a service value (in the example shown, "100"). The operation of the specified data gathering services are hosted by the cluster 12 that generates the message 34, so that the services can be changed by the cluster or new services added using another XML message. In the example shown, the data gathering service "CPU", once invoked as described below, periodically sends information regarding CPU usage on the associated cluster 12, whereas the data gathering service "space", once invoked as described below, periodically sends information regarding available storage space on the associated cluster 12. Other services can be implemented to support management operations, including, for example, RAM status and connectivity.

Proceeding to block 36 in FIG. 2, the PSM 26 gathers the information from the clusters and builds the profiles database 20, shown in FIG. 1. To do this, an XML component such as a DB2/XML extender or an SQLX XPath-based function such as XMLTable and XMLExtract can be applied to shred the XML and populate the database 20.

Figure 3:
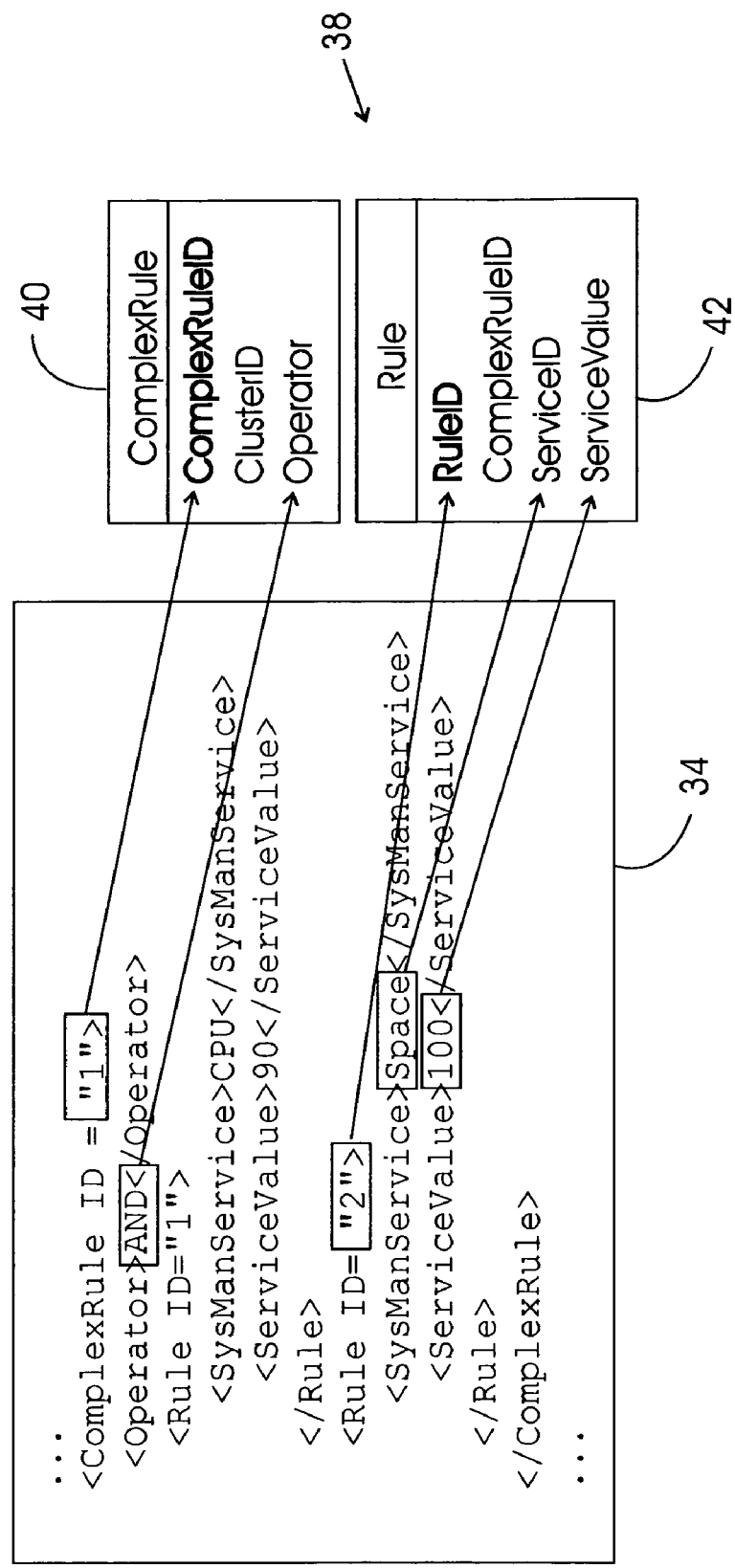
FIG. 3 is a schematic diagram showing the mapping of profile information from the cluster XML messages to the database schema.

FIG. 3 illustrates one exemplary way to map the information contained in the XML messages to a schema 38 for the database 20. A complex rule data structure 40 such as a table includes the complex rule ID from the message 34 and the ID of the cluster 12 that generated the message 34. Also, the complex rule data structure 40 includes the operator received in the message 34.

Figure 4:
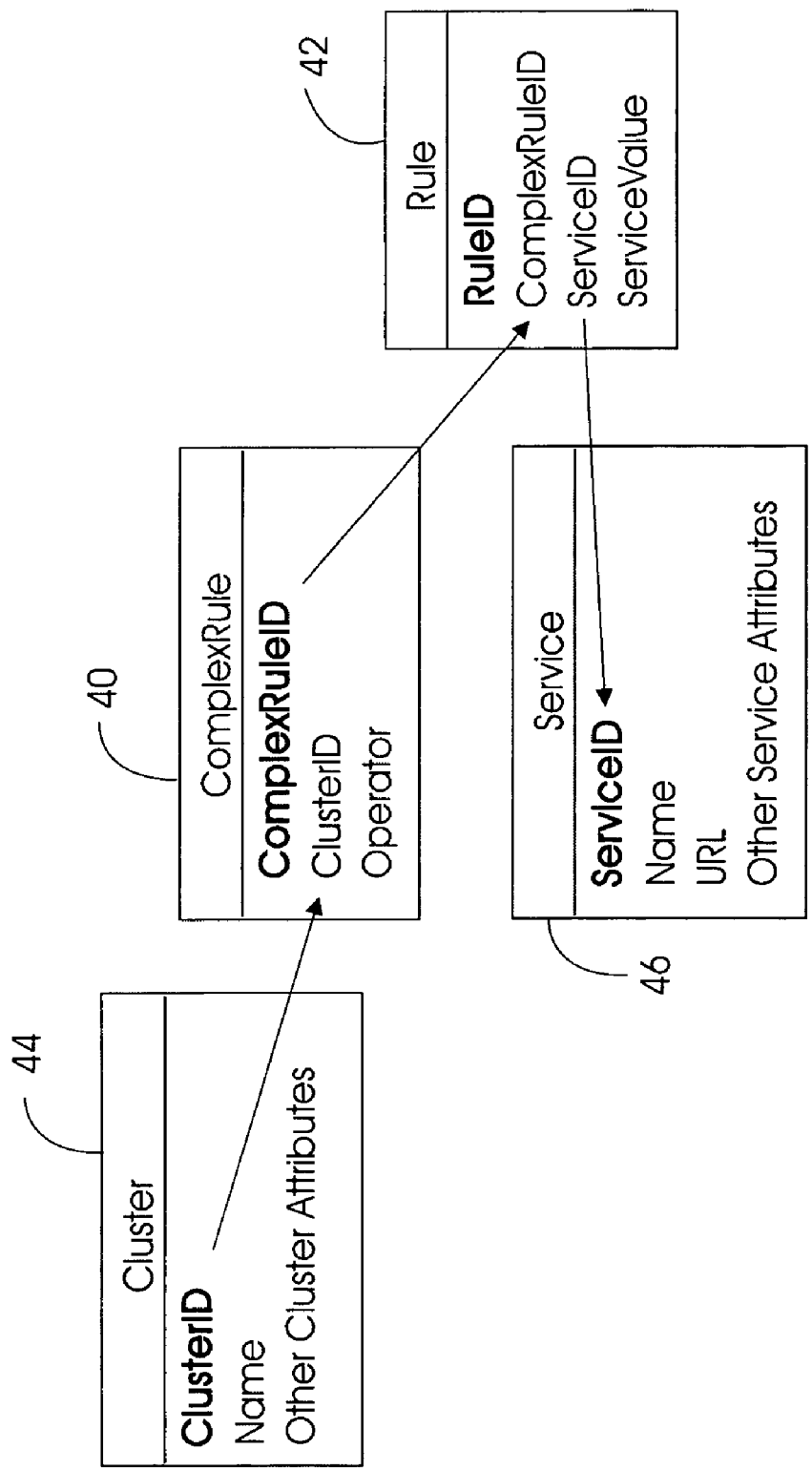
FIG. 4 is a diagram of the profiles database schema.

Additionally, the complex rule ID also appears in a rule data structure 42, and as can be appreciated best in reference to FIG. 4, a pointer exists between the complex rule ID in the complex rule structure 40 and the same value in the rule structure 42. The rule structure further includes the rule ID received in the message 34, as well as the service ID and service value received in the message 34.

Continuing the description of the database 20 schema as shown in FIG. 4, a cluster data structure 44 includes the cluster ID of the cluster that generated the message 34, and this points to the same cluster ID in the cluster data structure 40. The cluster data structure 44 further includes the name of the cluster and other cluster attributes as necessary.

Additionally, a service data structure 46 includes the service ID, pointed to by the rule data structure 42. The service data structure 46, in addition to the service ID, also contains the name of the service, its URL, and other service attributes as necessary. Several different types of clusters can be represented in the schema 38, as well as other rules and services, in accordance with the principles exemplified in FIG. 4.

Returning to the logic flow of FIG. 2, once the profiles database 20 has been built (and/or periodically updated to reflect new service information from the clusters 12), the logic moves to block 48, wherein the engine 18, using the notification manager 22, invokes the data gathering services whose names and IDs have been stored in the profile database 20. The services respond by gathering the necessary operating information, e.g., CPU usage and remaining available disk space, and this information is sent and gathered by the PSM 26 at block 50.

At block 52, the engine 18 periodically asynchronously accesses the operating information, and the notification manager 22 applies it to the rules to evaluate, using the appropriate service values, whether one or more rules has been triggered, i.e., whether the conditions for evaluating the rule "true" have been met. When plural notification managers are used, the manager 22 associated with a particular rule is looked up as mentioned above and applied to evaluate the rule. In one preferred, non-limiting implementation, a TSpaces application could function as a daemon to obtain the output of the PSM 26 and update a work area that is accessed by the engine 18 to execute the logic at block 52.

As an example, suppose a cluster's data gathering service "space" indicates that the remaining available disk space is "90". Further suppose that the corresponding service value in the database 20 is "90". In this case, the rule would be evaluated "true". If the rule is part of a complex rule, it is next determined whether the other rules related to that complex rule have been met.

When a rule has been evaluated "true", it is next determined whether a complex rule (as indicated by the operator received in the original profile XML message 34) requires that rule plus others to be "true", and these other rules are then evaluated. If there is no complex rule, or if all sub-rules (as might be required by an "and" operator) are determined to be "true", preferably within an evaluation time window, at block 54 the notification manager 22 informs the associated cluster using, e.g., an XML message by, e.g., one or more of email, instant messaging, paging, and making API calls. The cluster 12 may then take the necessary management action, e.g., shifting processor load among processors in the cluster, shifting storage among storage nodes in the cluster, starting processes, etc. The galaxy 14 of clusters can have galactic rules that are evaluated in the same manner as cluster rules, so that the galaxy can be managed as a single entity.

One preferred, non-limiting notification manager 22 can be configured as a service as follows (in WSDL):

```
<message name="NotifyRequest">
    <part name="clusterID" type="xsdstring"/>
<message>
<message name="NotifyResponse">
    <part name="notificationXML" type="xsd:string"/>
    <part name="clustername" type"xsd:string"/>
    <part name"servicename" type="xsd:string"/>
    <part name="servicevalue" type="xsd: string"/>
</message>
<portType name="NotificationPortType">
    <operation name "Notify">
```

-continued

```
        <input message="NotifyRequest"/>
        <output message="NotifyResponse"/>
    </operation>
<portType>
...
```

While the particular RULE-BASED METHOD AND SYSTEM FOR MANAGING HETEROGENOUS COMPUTER CLUSTERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A computer-implemented method for managing heterogenous computer-related clusters comprising:
    establishing at least one profile related to at least first and second clusters of computers, a first cluster of computers executing at least a first application but not a second application, a second cluster of computers executing at least the second application but not the first application, the profile representing at least one rule and at least one data gathering service hosted at the cluster, the data gathering service executing at least one act selected from the group consisting of: sending information regarding CPU usage on the associated cluster, sending information regarding available storage space on the associated cluster, sending information on RAM status, and sending information on connectivity;
    invoking the data gathering service to send operating information;
    asynchronously accessing the operating information to evaluate the rule; and
    if at least one condition related to the rule is evaluated as being satisfied, causing at least one management service to inform the cluster thereof, so that the cluster can execute appropriate action, whereby use of services facilitates management of heterogenous clusters.
2. The method of claim 1, wherein the first cluster executes Web indexer applications the second cluster executes Web crawler applications and a third cluster executes data mining applications.

3. The method of claim 2, wherein each profile is received from its respective cluster, each profile specifying at least one data gathering service related to the cluster and invokable to transmit the operating information for evaluation thereof using a rule.

4. The method of claim 3, wherein each profile is received in an XML message.

5. The method of claim 3, wherein the profiles are stored in a database.

6. The method of claim 5, wherein the database is a relational database and profile information is stripped from profile messages received from the clusters and added to the database.

7. The method of claim 6, wherein the database includes at least one rule identification correlated with at least one service identification.

8. The method of claim 7, wherein at least two rules are correlated with a complex rule, each rule correlated with the complex rule having an associated service.

9. The method of claim 1, wherein at least one service may be dynamically changed or added to a rule.

10. The method of claim 9, wherein a correlation of a service to a rule is defined by the associated cluster.

11. The method of claim 1, wherein at least one of whether a storage space threshold has been reached, and whether a computer workload threshold has been reached, is evaluated.

12. A computer system having processor and memory, comprising:
    plural heterogenous clusters; and
    at least one management engine accessing a profile database populated with information received from the clusters pertaining to rules, including complex rules, and to related information services, the management engine invoking the information services to send operating information from their respective clusters, the management engine periodically accessing the operating information and evaluating the rules using the operating information, the management engine accessing information in the database and informing a cluster if a related rule has been evaluated as being satisfied, to thereby indicate the necessity of load balancing and/or storage balancing activities by the cluster.

13. The system of claim 12, wherein a cluster undertakes load balancing and/or storage balancing activities responsive to information received from the management engine.

14. The system of claim 12, wherein the operating information is collected by at least one system manager associated with or embodied by the management engine, and the management engine asynchronously accesses the operating information.

15. The system of claim 12, wherein the clusters are heterogenous in that at least a first cluster is defined by a first genre of applications and at least a second cluster is defined by a second genre of applications.

16. The system of claim 12, wherein the management engine invokes a management service to inform a cluster if a related rule has been evaluated as being satisfied.

17. The system of claim 12, wherein the profile database is a relational database and profile information is stripped from profile messages received from the clusters and added to the database.

18. The system of claim 17, wherein the database includes at least one rule identification correlated with at least one service identification.

19. The system of claim 18, wherein at least two rules are correlated with a complex rule, each rule correlated with the complex rule having an associated service.

20. The system of claim 12, wherein at least one information service may be dynamically changed or added to a rule.

21. The system of claim 20, wherein a correlation of an information service to a rule is defined by the associated cluster.

22. The system of claim 12, wherein the management engine evaluates at least one of:
    whether a storage space threshold has been reached, and
    whether a computer workload threshold has been reached.

23. A computer program device containing computer readable means comprising:
    means for accessing operating information received from information services associated with respective clusters, the clusters not being constrained to be homogenous;
    means for evaluating at least one rule using the operating information; and
    means for informing a cluster if a rule has been evaluated as indicating the need for management activity.

24. The computer program device of claim 23, comprising means for establishing at least one profile related to at least one cluster, the profile embodying at least information related to the rule.

25. The computer program device of claim 23, wherein the means for accessing executes asynchronously.

26. The computer program device of claim 24, wherein the profile is received from its respective cluster.

27. The computer program device of claim 26, wherein each profile is received in an XML message.

28. The computer program device of claim 23, comprising means for storing the profiles in a database.

29. The computer program device of claim 28, wherein the database is a relational database and profile information is stripped from profile messages received from the clusters and added to the database.

30. The computer program device of claim 29, wherein the database includes at least one rule identification correlated with at least one information service identification.

31. The computer program device of claim 30, wherein at least two rules are correlated with a complex rule, each rule correlated with the complex rule having an associated service.

32. The computer program device of claim 23, wherein at least one information service may be dynamically changed or added to a rule.

33. The computer program device of claim 23, wherein the means for evaluating evaluates at least one of: whether a storage space threshold has been reached, and whether a computer workload threshold has been reached.

34. The computer program device of claim 23, wherein the rule is a complex rule.

35. The system of claim 12, comprising plural management services, the management engine invokes a first management service from among the management services to inform a cluster if a related rule has been evaluated as being satisfied.

* * * * *